(12) United States Patent
Yang et al.

(10) Patent No.: US 10,279,686 B2
(45) Date of Patent: May 7, 2019

(54) LOCOMOTIVE REGENERATIVE ELECTRIC ENERGY FEEDBACK SYSTEM WITH ICE MELTING FUNCTION AND CONTROL METHOD

(71) Applicants: NR ELECTRIC CO., LTD, Jiangsu (CN); NR ENGINEERING CO., LTD, Jiangsu (CN)

(72) Inventors: Hao Yang, Jiangsu (CN); Yu Wang, Jiangsu (CN); Yeyuan Xie, Jiangsu (CN); Hongde Liu, Jiangsu (CN); Changwei Li, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 0 days.

(21) Appl. No.: 16/080,276

(22) PCT Filed: Mar. 1, 2017

(86) PCT No.: PCT/CN2017/075368
§ 371 (c)(1),
(2) Date: Aug. 27, 2018

(87) PCT Pub. No.: WO2017/148397
PCT Pub. Date: Sep. 8, 2017

(65) Prior Publication Data
US 2019/0070964 A1    Mar. 7, 2019

(30) Foreign Application Priority Data
Mar. 3, 2016    (CN) .......................... 2016 1 0121099

(51) Int. Cl.
*B60L 7/10*        (2006.01)
*B60M 1/12*      (2006.01)
(Continued)

(52) U.S. Cl.
CPC ................. *B60L 7/10* (2013.01); *B60M 1/12* (2013.01); *H02G 7/16* (2013.01); *H02H 7/122* (2013.01);
(Continued)

(58) Field of Classification Search
USPC ........................................ 318/376, 375, 362
See application file for complete search history.

(56) References Cited

U.S. PATENT DOCUMENTS 8,487,558 B2 * 7/2013 Ogawa .................... B60L 50/51
318/139

FOREIGN PATENT DOCUMENTS

| CN | 101640400 A | 2/2010 |
|---|---|---|
| CN | 102832582 A | 12/2012 |

(Continued)

OTHER PUBLICATIONS

ISA/CN, International Search Report dated May 22, 2017 in International Patent Application No. PCT/CN2017/075368, total 4 pages with English translation.

*Primary Examiner* — David Luo
(74) *Attorney, Agent, or Firm* — Masuvalley & Partners

(57) ABSTRACT

A locomotive regenerative electric energy feedback system with an ice melting function, comprising two regenerative electric energy feedback devices (1). A direct-current side positive electrode of the regenerative electric energy feedback device (1) is connected to a positive electrode bus of a subway traction network, wherein the positive electrode bus is connected to an uplink contact network and a downlink contact network respectively via a first switching switch (4) and a second switching switch (5). A direct-current side negative electrode of the regenerative electric energy feedback device (1) is connected to the downlink contact network or the uplink contact network via a third switching
(Continued)

switch (2), and the direct-current side negative electrode is connected to a negative electrode bus of the subway traction network via a fourth switching switch (3). Further disclosed is a control method corresponding to the system. In the system and method, the ice melting function on a contact network circuit between two traction stations is achieved by means of switch switching and a control method for adjusting the regenerative electric energy feedback devices, and an original regenerative electric energy feedback device is used without adding an additional device, so that the reliability is high.

5 Claims, 5 Drawing Sheets

(51) Int. Cl.
*H02G 7/16* (2006.01)
*H02H 7/122* (2006.01)
(52) U.S. Cl.
CPC ....... *B60L 2200/26* (2013.01); *B60Y 2200/31* (2013.01)

(56) References Cited

FOREIGN PATENT DOCUMENTS

| | | |
|---|---|---|
| CN | 105034854 A | 11/2015 |
| CN | 105730248 A | 7/2016 |
| DE | 19757079 A1 | 6/1998 |

\* cited by examiner

LOCOMOTIVE REGENERATIVE ELECTRIC ENERGY FEEDBACK SYSTEM WITH ICE MELTING FUNCTION AND CONTROL METHOD

BACKGROUND OF THE INVENTION

Technical field

The present invention relates to the technical field of large-power power electronics applied to rail transport, and in particular, to a locomotive regenerative electric energy feedback system with an ice melting function and a control method.

Background

A locomotive regenerative electric energy feedback system is applied in occasions of regenerative electric energy absorption and feedback on rail transport, to feed the regenerative electric energy back to the power grid.

A principle of a regenerative electric energy feedback device may be described briefly as follows: After a vehicle enters a braking status, the kinetic energy of the locomotive is converted into electric energy. When the electric energy is input to a direct-current power grid, a voltage of the direct-current power grid is caused to rise. A control system of the regenerative electric energy feedback device detects the voltage of the direct-current power grid in real time. An inverter is started when the voltage of the direct-current power grid rises to a particular preset value. The inverter begins to work, and feeds extra electric energy back to an alternating-current power grid.

In winter, due to the combined effect of the temperature, air humidity and wind speed, there is an icing phenomenon in which ice is formed from liquid water. Therefore, icing is a freezing phenomenon produced under certain weather conditions. If ice is formed on a large area of an overhead conductor, masts and towers may fall, and the conductor covered with ice may wave or fracture, thus directly affecting the normal and safe operation of overhead lines. For electrified railways, a pantograph cannot normally take a flow due to the ice covering a contact network, and even the pantograph is damaged or broken, which will seriously affect the safe and on-time operation of the train. Currently, there are existing ice-melting solutions which require an additional ice-melting device, resulting in increases in additional investment, equipment space, and the complexity of the system.

The present invention can use the locomotive regenerative electric energy feedback system to implement the ice melting function without increasing additional investment.

SUMMARY OF THE INVENTION

To solve the ice melting problem on a contact network of electrified railways, the present invention provides a solution of using a locomotive electric energy feedback system that can melt ice, where a locomotive regenerative electric energy feedback system installed in a traction station can be used, without increasing additional investment.

The specific solution is as follows:

A locomotive regenerative electric energy feedback system with an ice melting function includes two regenerative electric energy feedback devices. A direct-current side positive electrode of the regenerative electric energy feedback device is connected to a positive electrode bus of a subway traction network, where the positive electrode bus is connected to an uplink contact network and a downlink contact network respectively via a first switching switch and a second switching switch. A direct-current side negative electrode of the regenerative electric energy feedback device is connected to the downlink contact network or the uplink contact network via a third switching switch, and the direct-current side negative electrode is connected to a negative electrode bus of the subway traction network via a fourth switching switch.

The regenerative electric energy feedback device includes a rectifier formed by power semiconductor devices. The rectifier has a function of enabling active power to flow in two directions, that is, the rectifier can control the active power to flow from an alternating-current power grid to a direct-current bus of the subway traction network, and can also control the active power to flow from the direct-current bus of the subway traction network to the alternating-current power grid.

The third switching switch and the fourth switching switch are not allowed to be closed at the same time.

The present invention further provides a control method of the locomotive regenerative electric energy feedback system. When regenerative electric energy feedback devices operate in an energy feedback status, the control method is as follows:
- step 1: opening a third switching switch;
- step 2: closing a fourth switching switch; and
- step 3: when the locomotive brakes, starting a rectifier, to control active power to flow from a direct-current bus of a subway traction network to an alternating-current power grid.

When the regenerative electric energy feedback devices operate in an ice melting status, the control method is as follows:
- if the third switching switch is connected to an uplink contact network, the steps are as follows:
- step 1: opening a first switching switch and a fourth switching switch;
- step 2: closing a second switching switch and the third switching switch;
- step 3: starting a rectifier of one of the regenerative electric energy feedback devices, to make a direct-current voltage stable; and
- step 4: starting a rectifier of the other of the regenerative electric energy feedback devices, to make the current flowing through the contact network stable by regulating the direct-current voltage; or
- if the third switching switch is connected to a downlink contact network, the steps are as follows:
- step 1: opening a second switching switch and a fourth switching switch;
- step 2: closing a first switching switch and the third switching switch;
- step 3: starting a rectifier of one of the regenerative electric energy feedback devices, to make a direct-current voltage of a traction network stable; and
- step 4: starting a rectifier of the other of the regenerative electric energy feedback devices, to make the current flowing through the contact network stable by regulating the direct-current voltage.

The beneficial effects of the present invention are as follows:
1. The present invention uses a locomotive electric energy feedback system in a traction station to implement an ice melting function by means of switch switching and adjustment of a control method, without adding an additional device. Generally, the locomotive regenerative electric energy feedback system is put into operation during a subway operation time in the daytime. When no vehicle operates on the contact network at night, the locomotive electric energy feedback system can be switched to an ice melting status, to control the current through the contact network and implement an ice melting function, achieving higher equipment utilization.

2. In the solution of the present invention, voltages of direct-current buses of the two regenerative electric energy feedback devices can be regulated within a certain range. Thus, the current is controllable in an ice melting process, and a short-circuit point does not need to be set, so that the operation process is secure and reliable. In this solution, it is not required to add matched resistance to regulate the current, the produced heat is completely used in ice melting of lines, and the operation efficiency of the equipment is high.

3. The solution of the present invention can melt ice on the whole line of the contact network between two stations, and therefore can melt ice in a larger area as compared with an ice melting manner for a single station.

DETAILED DESCRIPTION

The present invention will be described in further detail below with reference to the accompanying drawings.

Figure 1:
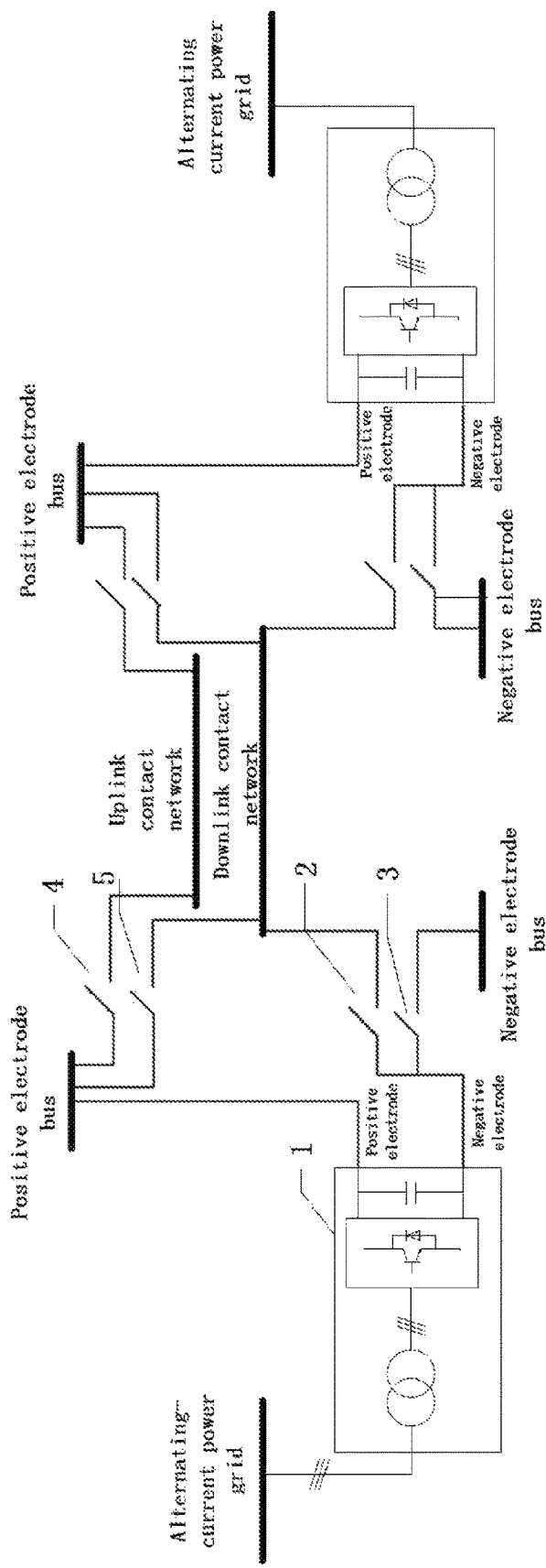
FIG. 1 is a schematic diagram of an overall system of the present invention, where
meanings of numerals in the figure: 1. regenerative electric energy feedback device, 2. third switching switch, 3. fourth switching switch, 4. first switching switch, and 5. second switching switch.

As shown in FIG. 1, this embodiment includes two regenerative electric energy feedback devices 1, including two sets of regenerative electric energy feedback devices and switches connected to the devices. The two systems have the same configurations. A schematic diagram including the two sets of regenerative electric energy feedback devices is shown in FIG. 1. Two adjacent stations are connected via a contact network. A direct-current side positive electrode of each regenerative electric energy feedback device is connected to a positive electrode bus of a subway traction network, where the positive electrode bus is connected to an uplink contact network and a downlink contact network respectively via a first switching switch 4 and a second switching switch 5.

In this embodiment, a direct-current side negative electrode of the regenerative electric energy feedback device is connected to the downlink contact network via a third switching switch 2, and the direct-current side negative electrode is connected to a negative electrode bus of the subway traction network via a fourth switching switch 3.

Figure 2:
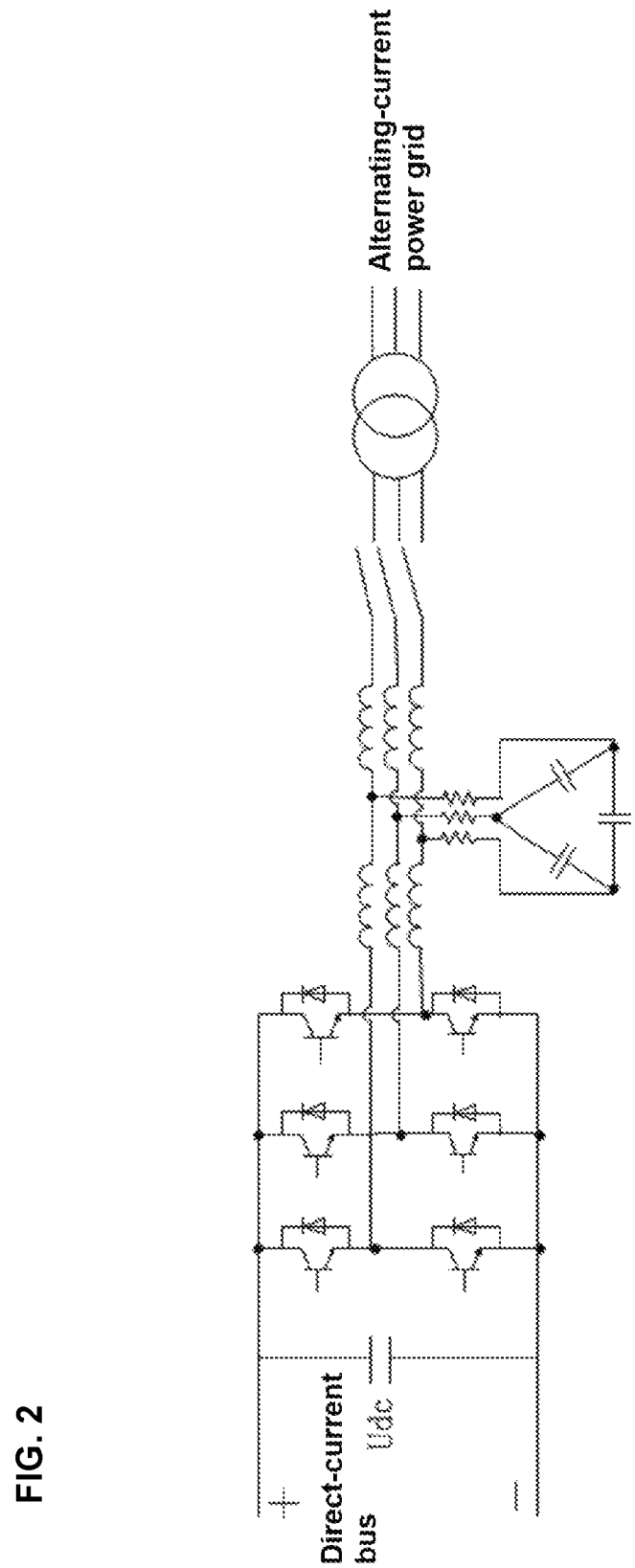
FIG. 2 is a topological diagram of a regenerative electric energy feedback device.

The regenerative electric energy feedback device 1 includes a rectifier formed by power semiconductor devices. The rectifier has a function of enabling active power to flow in two directions, that is, the rectifier can control the active power to flow from an alternating-current power grid to a direct-current bus of the subway traction network, and can also control the active power to flow from the direct-current bus of the subway traction network to the alternating-current power grid. A topological structure of the rectifier is shown in FIG. 2. In this embodiment, the rectifier has a three-phase bridge rectifier circuit formed by an insulated-gate bipolar transistor (IGBT), which can implement bidirectional flow of the power.

The third switching switch 2 and the fourth switching switch 3 are interlocked, and are not allowed to be closed at the same time.

Figure 4:
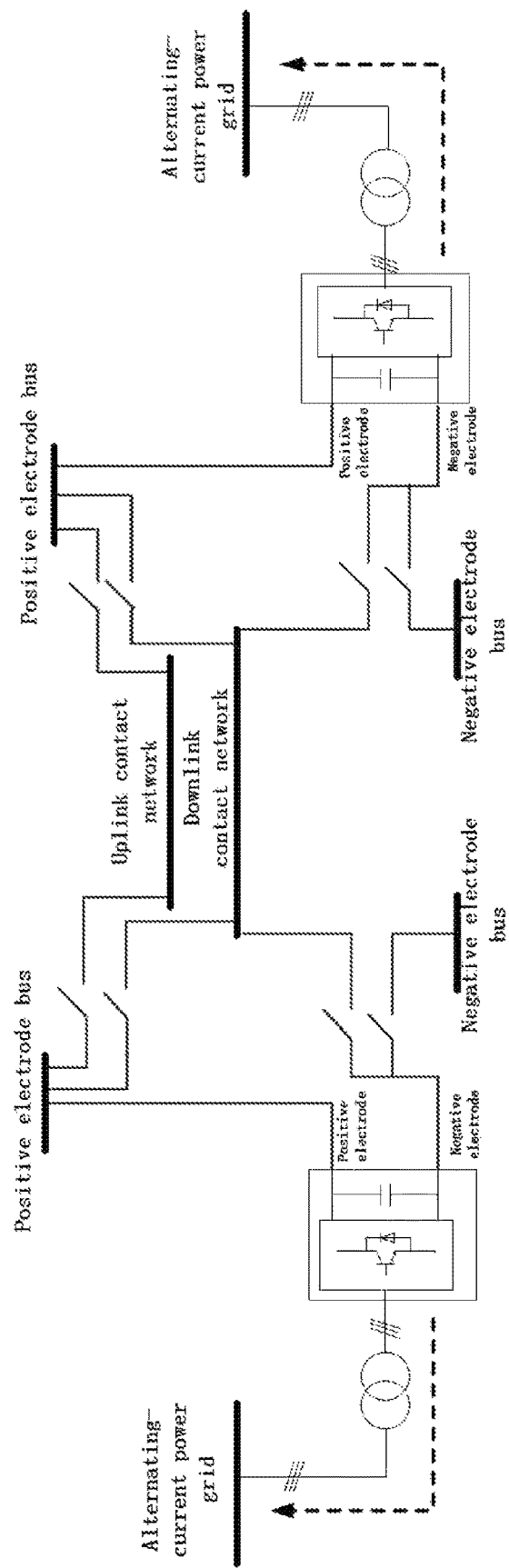
FIG. 4 is a diagram of a current loop when a solution of the present invention works in a regenerative electric energy feedback status.

A control method of this embodiment is as follows:
When regenerative electric energy feedback devices operate in an energy feedback status, the control method is as follows:
 step 1: opening a third switching switch;
 step 2: closing a fourth switching switch; and
 step 3: when the locomotive brakes, starting a three-phase rectifier, to control active power to flow from a direct-current bus of a subway traction network to an alternating-current power grid. FIG. 4 shows a current loop.

Figure 3:
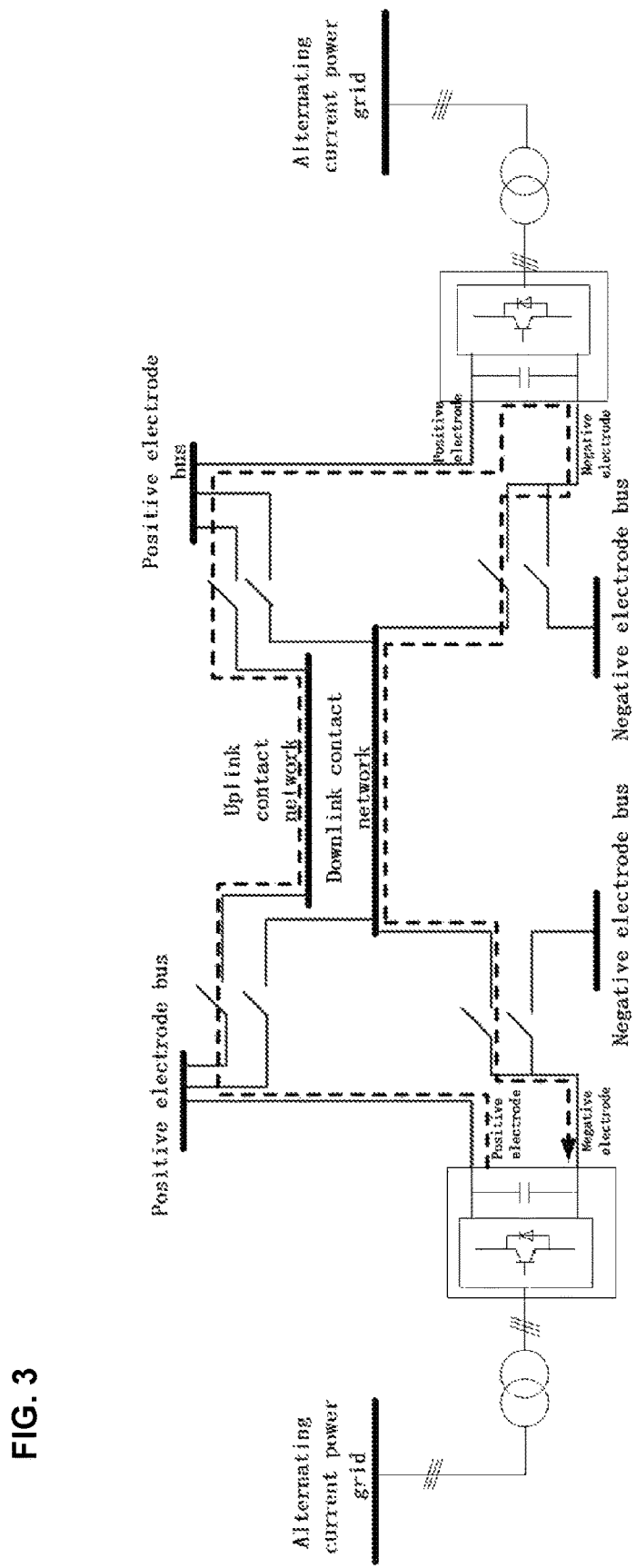
FIG. 3 is a diagram of a current loop at a direct-current side when a solution of the present invention works in an ice melting status.

When the regenerative electric energy feedback devices operate in an ice melting status, the control method is as follows:
 if the third switching switch is connected to a downlink contact network in this embodiment, the steps are as follows:
 step 1: opening a second switching switch and a fourth switching switch;
 step 2: closing a first switching switch and the third switching switch;
 step 3: starting a rectifier of one of the regenerative electric energy feedback devices, to make a direct-current voltage of the traction network stable; and
 step 4: starting a rectifier of the other of the regenerative electric energy feedback devices, to make the current flowing through the contact network stable by regulating the direct-current voltage. FIG. 3 shows a current loop.

Figure 5:
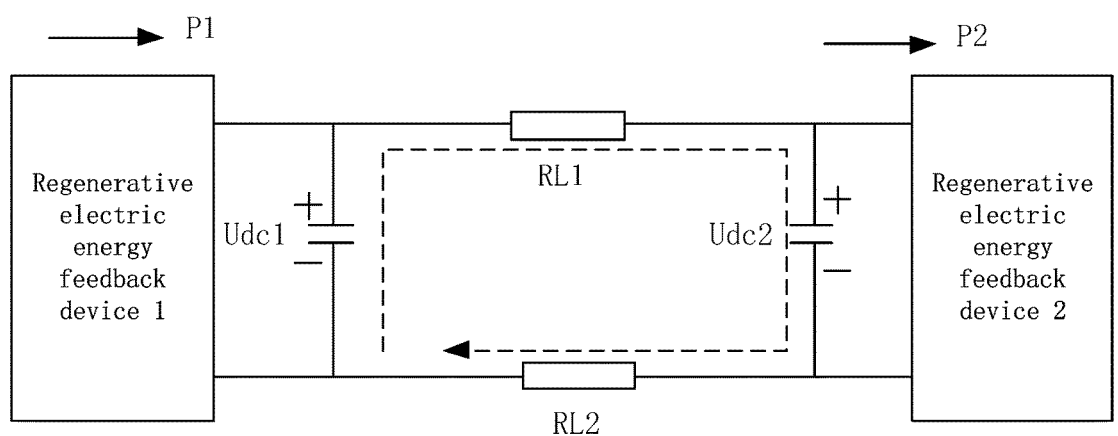
FIG. 5 is an equivalent schematic diagram of a solution of the present invention in an ice melting status.

FIG. 5 is an equivalent schematic diagram in an ice melting status. A specific method for controlling an ice-melting current is described with reference to FIG. 5. A direct-current voltage Udc1 regulated by the regenerative electric energy feedback device 1 in the figure is 1800V. It is supposed that the resistance of the contact network is $RL1=RL2=0.2\Omega$, and the total resistance of the contact network is $0.4\Omega$. If a control target for a required ice-melting current is 800 A and a voltage drop based on the resistance of the contact network is 320V, the target can be achieved by regulating the direct-current voltage of the regenerative electric energy feedback device 2, that is, $Udc2=1800V-320V=1480V$. In this case, the capacitance of the regenerative electric energy feedback device 1 is in a discharge status, and maintains constant at 1800V. The regenerative electric energy feedback device 1 needs to acquire the power P1 from the alternating-current power grid. The capacitance of the regenerative electric energy feedback device 2 is in a charging status. To maintain the capacitance and voltage stable, the surplus power P2 needs to be delivered back to the power grid. An energy difference of P1−P2 is consumed for the resistance of the contact network, thus melting the ice by using the heat.

The foregoing embodiment is merely used to describe the technical solution of the present invention, but is not intended to limit the present invention. Various modifications and changes made with reference to the foregoing embodiment all fall within the protection scope of the present invention.

What is claimed is:

1. A locomotive regenerative electric energy feedback system with an ice melting function, comprising two regenerative electric energy feedback devices, wherein a direct-current side positive electrode of the regenerative electric energy feedback device is connected to a positive electrode bus of a subway traction network, the positive electrode bus is connected to an uplink contact network and a downlink contact network respectively via a first switching switch and a second switching switch, characterized in that, a direct-current side negative electrode of the regenerative electric energy feedback device is connected to the downlink contact network or the uplink contact network via a third switching switch, and the direct-current side negative electrode is connected to a negative electrode bus of the subway traction network via a fourth switching switch.

2. The locomotive regenerative electric energy feedback system with an ice melting function of claim 1, characterized in that, the regenerative electric energy feedback device comprises a rectifier formed by power semiconductor devices; the rectifier has a function of enabling active power to flow in two directions, that is, the rectifier is able to control the active power to flow from an alternating-current power grid to a direct-current bus of the subway traction network, and is also able to control the active power to flow from the direct-current bus of the subway traction network to the alternating-current power grid.

3. The locomotive regenerative electric energy feedback system with an ice melting function of claim 1, characterized in that, the third switching switch and the fourth switching switch are not allowed to be closed at the same time.

4. A control method of the locomotive regenerative electric energy feedback system with an ice melting function of claim 1, characterized in that, when regenerative electric energy feedback devices operate in an energy feedback status, the control method comprises the following steps:
   step 1: opening a third switching switch;
   step 2: closing a fourth switching switch; and
   step 3: when the locomotive brakes, starting the regenerative electric energy feedback devices, to control active power to flow from a direct-current bus of a subway traction network to an alternating-current power grid.

5. A control method of the locomotive regenerative electric energy feedback system with an ice melting function of claim 1, characterized in that, when regenerative electric energy feedback devices operate in an ice melting status, the control method is specifically as follows:
   1. if the third switching switch is connected to an uplink contact network, the steps are as follows:
   step 101: opening a first switching switch and a fourth switching switch;
   step 102: closing a second switching switch and the third switching switch;
   step 103: starting a rectifier of one of the regenerative electric energy feedback devices, to make a direct-current voltage stable; and
   step 104: starting a rectifier of the other of the regenerative electric energy feedback devices, to make the current flowing through the contact network stable; or
   2. if the third switching switch is connected to a downlink contact network, the steps are as follows:
   step 201: opening a second switching switch and a fourth switching switch;
   step 202: closing a first switching switch and the third switching switch;
   step 203: starting a rectifier of one of the regenerative electric energy feedback devices, to make a direct-current voltage of a traction network stable; and
   step 204: starting a rectifier of the other of the regenerative electric energy feedback devices, to make the current flowing through the contact network stable.

* * * * *